May 11, 1965 R. W. GIBSON, JR 3,183,140
SIMULATED DIVIDED TRANSPARENT SHEET AND
METHOD OF MAKING THE SAME
Filed Dec. 7, 1960
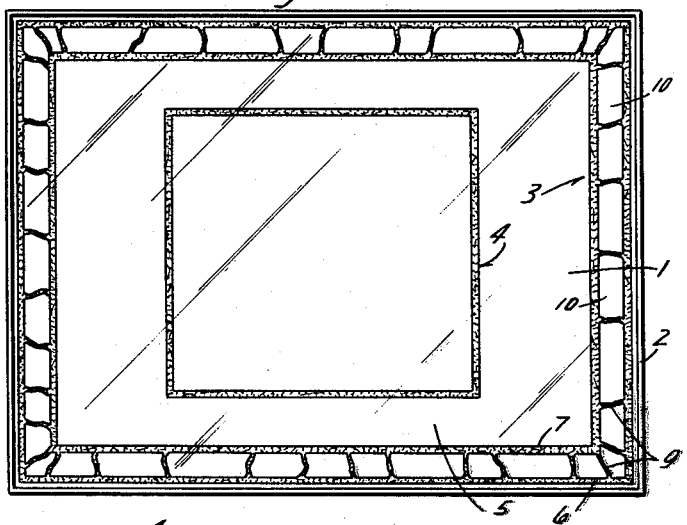
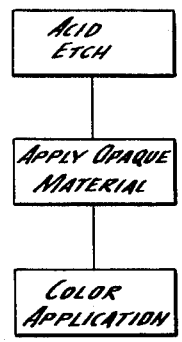
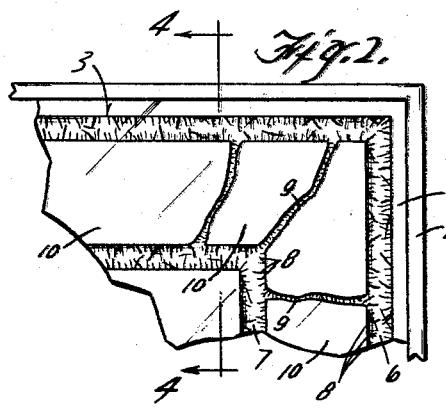
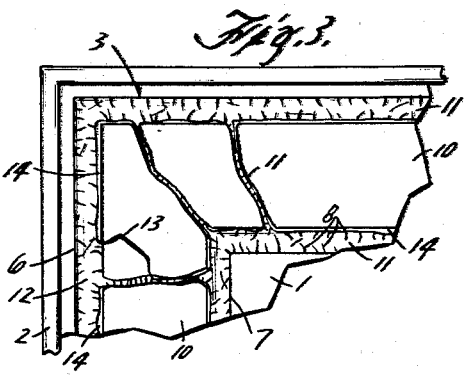
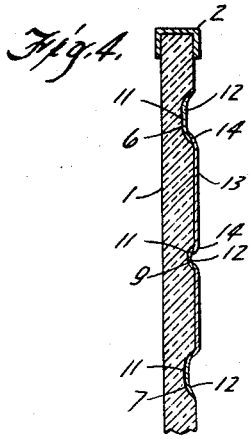
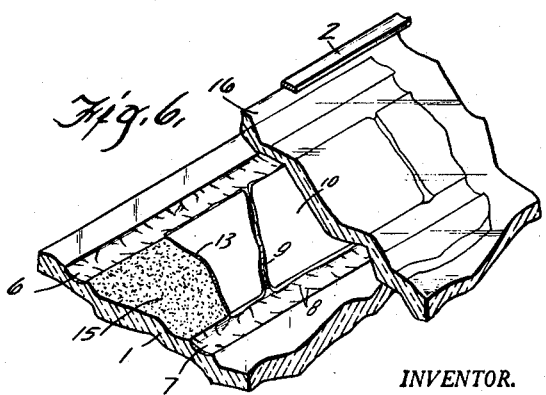
INVENTOR.
Ralph W. Gibson, jr.
BY
Andrus & Starke
ATTORNEY

United States Patent Office 3,183,140
Patented May 11, 1965

3,183,140
SIMULATED DIVIDED TRANSPARENT SHEET
AND METHOD OF MAKING THE SAME
Ralph W. Gibson, Jr., Milwaukee, Wis., assignor to Jos. Schlitz Brewing Company, Milwaukee, Wis., a corporation of Wisconsin
Filed Dec. 7, 1960, Ser. No. 74,284
4 Claims. (Cl. 161—5)

This invention relates to a simulated sectionalized or divided transparent sheet and to the method of making the same and is more particularly directed to a method for forming of a simulated leaded stained glass or other transparent sheet.

Leaded strained glass has been employed for windows and many other articles such as lamp shades and the like. Normally, in true leaded glass and the like, the glass is divided or sectionalized and consists of a number of properly shaped and colored pieces of glass which are arranged in a desired configuration. The individual elements or pieces of glass are interconnected by means of lead holding strips which extend between the individual glass elements to produce a continuous sheet.

Actual leaded glass employing the above construction is extremely expensive, which has substantially reduced its practical application where cost is an important consideration. Further, leaded glass windows have limited strength characteristics and are difficult to wash.

Simulated leaded glass designs have generally been substituted for the actual leaded glass where low cost is required. For example, in various advertising and commercial development programs, a simulated leaded glass has been employed. Normally, such simulated leaded glass has been provided by the use of decals or transparencies wherein a print is secured to the back side of a transparent sheet such as a glass or plastic window. However, decals and transparencies are obvious imitations and do not closely approximate reality. This is particularly true as regards the dividing strip separating the several colored sections in the simulated leaded glass.

Further, decals and transparencies employed in advertising at various local outlets must be periodically removed for various reasons. The removal of decals and transparencies is relatively difficult and expensive. In removal, the transparency or decal is destroyed. This is particularly burdensome where a merchandiser accepts the responsibility of removing such simulated items if the purchaser subsequently stops sales of the line.

The present invention is directed to the structure and process of forming an improved simulated divided transparent unit or element and particularly in the preferred contemplated use of closely approximating the appearance of leaded stained glass. As hereinafter employed, the terminology transparent units includes translucent and similar units capable of transmitting light.

Generally, in accordance with the present invention, a groove or depression is formed on the transparent element or sheet in accordance with the separating strips of the desired configuration. The groove is coated with a substantially opaque material corresponding to the color and character of the separation strip, such as a leaded strip, to be imitated. When viewed, the integral coating in the groove gives the effect of an actual separation strip. The area defined by the groove is colored with a material permitting corresponding light passage in accordance with a desired simulated stained glass appearance or the like.

A glass sheet or other transparent support may be secured overlying the grooved sheet to maintain a smooth continuous surface on both sides of the unit. The laminated structure has relatively great strength and is readily cleaned.

The present invention provides a simulated sectionalized or divided transparent sheet which appears extremely realistic. The invention has particular usage in advertising and the like where it is desirable to provide a simulated stained glass in some areas of an otherwise specially designed transparent unit which is normally associated with an illuminating light arranged at the back side of the sign.

If desired, certain of the areas may be formed as a frosted glass. The coloring or simulating stain is then applied to the frosted area. Light striking the sheet is reflected by the broken surface in the frosted areas and results in simulating the appearance of directing light through the transparent sheet, while avoiding use of such light.

The drawing furnished herewith illustrates the best mode presently contemplated for carrying out the invention.

In the drawing:

FIGURE 1 is a front elevational view of a transparent sheet including simulated divided stained portions constructed in accordance with the present invention;

FIG. 2 is an enlarged fragmentary view of FIGURE 1 more clearly illustrating the divided portion cosntructed in accordance with the present invention;

FIG. 3 is a rear view of FIG. 2;

FIG. 4 is an enlarged section taken on line 4—4 of FIG. 2;

FIG. 5 is a flow chart illustrating the preferred process of forming the divided glass area; and FIG. 6 is a fragmentary perspective view showing a divided transparent sheet having frosted stained sections.

Referring to the drawing and particularly to FIGURE 1, a transparent sheet 1 is illustrated which is adapted to be employed as an advertising panel for the merchandising of a desired product or products. A mounting or guard frame 2 of suitable metal, plastic or the like is disposed over the perimeter of the transparent sheet 1 where elimination of sharp edges and protection of the edges of the sheet against damage is deemed necessary. Such a frame 2 is particularly important where the transparent sheet 1 constitutes a glass medium and presents relatively sharp cutting edges adjacent the perimeter. A simulated leaded stained glass border 3 is provided spaced slightly inwardly from the outermost perimeter of the transparent sheet. A leaded rectangular frame 4 is spaced inwardly from the border 3 to constitute a separate section suitable for receiving of advertising material and the like. In the illustrated embodiment of the invention, a transparent section 5 exists between border 3 and frame 4 and may give the effect of complete separation of the border 3 from the area defined by frame 4.

As previously noted, sheet 1 is of any suitable transparent material and will conventionally be formed of glass or plastic. For purposes of illustration, it is assumed that the transparent sheet 1 is formed of the conventional window glass.

Referring particularly to FIG. 2, the stained glass border 3 includes outer and inner rectangular lead simulating strips 6 and 7 within which there are small lateral edge fissures 8 to increase the leaded effect. Similar separating or partition strips 9 extend laterally between the outer and inner strips 6 and 7 and define a plurality of arbitrarily selected sections or segments 10 within the stained glass border 3 to simulate conventional leaded glass division or sectionalization. The segments 10 are colored with a suitable stain or coloring medium, as subsequently described, to completely simulate the effect of a leaded stained glass window.

A preferred process for construction of the stained glass configuration shown in the drawing is now described.

The frame 4, strips 6 and 7 and separation or partition strips 9 are each in the form of a groove 11 provided in the back surface of the transparent sheet 1, as most clearly shown in FIGS. 3 and 4.

The grooves 11 are preferably formed by the process of acid etching wherein the configuration is laid out on the back side of the sheet and the areas not to be grooved are sealed from or covered by a suitable screen or template. Acid is then applied to the uncovered area conforming to the desired configuration lines and the acid removes glass from the corresponding areas to form grooves 11. The acid flow forms the fissures 8 which extend partially laterally from the edges of the grooves toward the base of the groove 11. If such fissures or irregularities are not desired, they can of course be removed by any conventional means.

A lead simulating material 12 is then applied into grooves 11 as by spraying, silk screening or any other desired process. Applicant has found that a silver paint with black added is very satisfactory. The black provides a shadow effect which establishes and creates a very real simulation of a leaded glass strip or separation.

A coloring medium 13, shown substantially enlarged in depth in FIG. 4 for clarity, is then applied in the areas defined by the strips 6 and 7 and the partition strips 9 as by silk screening, spray painting or the like. The coloring medium 13 can be formed of a transparent or translucent medium depending upon the effect desired and may be selected to provide the same or different coloring in adjacent sections 10. A combination of the above forms of medium can also be employed.

The coloring medium 13 is preferably applied after formation of the grooves 11 and the application of the lead simulating medium 12. This is true because, as most clearly shown in FIG. 4, the application of the coloring medium 13 tends to flow somewhat into the grooves 11 as at 14. The lead simulating material 12 is normally an opaque type material and therefore the overlapping of the coloring medium 13 onto the back side of the lead simulating medium 12 does not appear when viewed from the front side of the transparent sheet 1. Further, if the coloring medium 13 is applied before formation of the grooves 11, there is a danger of destroying the coloring medium particularly where an acid etching process is employed. However, in accordance with the broad aspect of the present invention and where the above advantages are not desired, the particular sequence of steps can be selected in accordance with other considerations.

The coloring medium 13 can also be applied to the front side of the transparent sheet 1. However, the depth of the transparent sheet 1 reduces the realistic appearance of the simulated stained glass separation and is not therefore considered as desirable a construction as that previously described.

Each of the segments 10 can be separately grooved or textured to form transparent configurations such as stars or the like after the coloring medium has been applied.

The segments can also be pre-grooved or textured in any desired manner before application of the coloring medium 13 to control the shading or coloring within each section. A depressed or grooved area within a segment 10 may carry a thicker layer of the coloring medium 13 and thus appears as a darker color when viewing the transparent sheet.

The present invention thus permits formation of a realistic simulated leaded stained glass window or the like and further permits modifying of the appearance of the glass window in accordance with unlimited configurations and coloring.

As shown in FIG. 6, the back side of each of the segments 10 may be frosted as at 15 to establish a completely pitted area. The coloring medium 13 is applied to the frosted glass sections as previously described, in accordance with any suitable processes.

The frosted glass 15 results in reflection of light transmitted through the front side of the transparent sheet 1. Consequently, the reflected light gives the effect of having a light mounted behind the transparent sheet with the light flowing from the back to the front. Therefore, the transparent sheet 1 can be viewed from a light to a dark area and still obtain the stained glass effect.

FIG. 6 additionally shows a transparent backing sheet 16 secured to the back side of the transparent sheet 1. The backing sheet 16 increases the strength of the unit, protects the coloring applied to the back side of the transparent sheet 1, and permits easy cleaning of the unit on the back side.

The illustrated embodiments describe a process beginning with a transparent sheet 1 and subsequently forming the grooves 11. In large production or the like, the transparent sheet 1 may during its process of being formed into a sheet, be pre-pressed or formed with the desired groove configuration.

The illustrated embodiment of the invention shows a single broad groove forming the separating strips. Such grooves can also be formed by a series of closely-spaced narrow grooves to simulate a broad groove.

The sheet 1 can also be manufactured with a fused or laminated color on the surface thereof and the separation strip grooves subsequently formed and, if desired, color applied to establish a desired effect.

The present invention can also be applied to articles or elements of a configuration which is not flat.

The present invention thus provides a low-cost, realistic simulated stained glass or transparent member which is adapted for mass production.

Various modes of carrying out the invention are contemplated as being within the scope of the following claims particularly pointing out and distinctly claiming the subject matter which is regarded as the invention.

I claim:

1. A transparent one-piece glass element of a continuous similar composition for transmitting light therethrough and having a planar front and back, said element having intersecting grooves on the back of the element dividing the element into a plurality of sections, said grooves having a generally shallow U-shaped cross section with edge fissures extending laterally inwardly from the edges of the grooves, and an opaque lead colored material coating the groove including the edge fissures to prevent transmission of light through the groove while transmitting the light through the adjacent portions, said grooves simulating lead strips whereby the adjacent sections appear as separate sub-elements and realistically simulate a stained glass separation.

2. The transparent element of claim 1 having a light transmitting coloring medium coating the apparent separate and distinct sections and thereby realistically simulating a stained glass unit having separate color segments joined by lead strips.

3. In a method of forming a simulated stained glass unit of an interior single composition, said unit comprising a plurality of simulated separate glass pieces held together by simulated lead separation strips, comprising the steps of covering one side of the sheet with a protective cover of acid resistant material, exposing only those areas corresponding to the lead separation strips, applying acid over the covered side and thereby acid etching grooves on the one side of the glass sheet in accordance with the lead separation strips to be simulated, said acid etching creating a groove having a generally U-shaped cross section having laterally extending edge fissures, applying an opaque lead-colored medium within the grooves including the edge fissures and thereby simulating a lead strip.

4. The method of claim 3 including a final step of applying a light transmitting color medium to the grooved side of the apparent glass sections.

References Cited by the Examiner

UNITED STATES PATENTS

| | | | |
|---|---|---|---|
| 1,527,005 | 2/25 | Ogren | 161—1 |
| 1,604,459 | 10/26 | Lyons | 161—4 |
| 1,790,531 | 1/31 | Bethlem | 161—2 |
| 1,983,720 | 12/34 | West | 117—8 |
| 2,095,402 | 10/37 | Stark | 161—1 |
| 2,239,520 | 4/41 | Gurwood | 161—4 |
| 2,628,160 | 2/53 | Stookey | 41—24 XR |
| 2,749,794 | 6/56 | O'Leary | 41—26 XR |
| 2,811,800 | 11/57 | Gesek | 41—24 XR |
| 2,876,574 | 3/59 | Powell | 41—24 XR |
| 2,982,042 | 5/61 | Gick | 41—24 XR |

EARL M. BERGERT, *Primary Examiner.*

HAROLD ANSHER, A. P. KENT, *Examiners.*